United States Patent [19]
LeClair et al.

[11] Patent Number: 5,822,510
[45] Date of Patent: Oct. 13, 1998

[54] SYSTEM AND METHOD FOR USING VARIED BINARIZATION PROCESSING TO IMPLEMENT A PRINTER DRIVER ARCHITECTURE

[75] Inventors: Gregory A. LeClair, San Jose, Calif.; Kazuo Nakamura, Shiojiri, Japan

[73] Assignee: Seiko Epson Corporation, Tokyo, Japan

[21] Appl. No.: 947,191

[22] Filed: Oct. 8, 1997

Related U.S. Application Data

[63] Continuation of Ser. No. 573,019, Dec. 15, 1995.

[60] Provisional application No. 60/007,191, Nov. 1, 1995 and 60/007,183, Nov. 1, 1995.

[51] Int. Cl.$^6$ .................................................. G06K 15/00
[52] U.S. Cl. .................................. 395/116; 395/117
[58] Field of Search .................................. 395/112, 114, 395/115, 116–117, 827, 840, 872, 874; 345/507, 509, 510; 358/404, 444, 261.4

[56] References Cited

U.S. PATENT DOCUMENTS 5,216,754  6/1993  Sathi et al. ............................. 395/115

FOREIGN PATENT DOCUMENTS

| 0 575 167 | 12/1993 | European Pat. Off. . |
| 0 578 264 | 1/1994 | European Pat. Off. . |
| 0665675 | 1/1995 | European Pat. Off. ......... H04N 1/60 |
| 0665677 | 1/1995 | European Pat. Off. ......... H04N 1/60 |

*Primary Examiner*—Arthur G. Evans
*Attorney, Agent, or Firm*—W. Glen Johnson; Eric B. Janofsky

[57] ABSTRACT

A printer driver comprising a separate page driver for analyzing print data and storing analysis data into a journal file, a journal file processor for retrieving the analysis data from the journal file, and a separate render driver for variably processing the print data depending on the type of stored analysis information, rendering the variably processed print data into picture elements having a reduced pixel depth, storing the picture elements into a band buffer, and providing the picture elements to a printer to produce high-quality printed images.

10 Claims, 14 Drawing Sheets

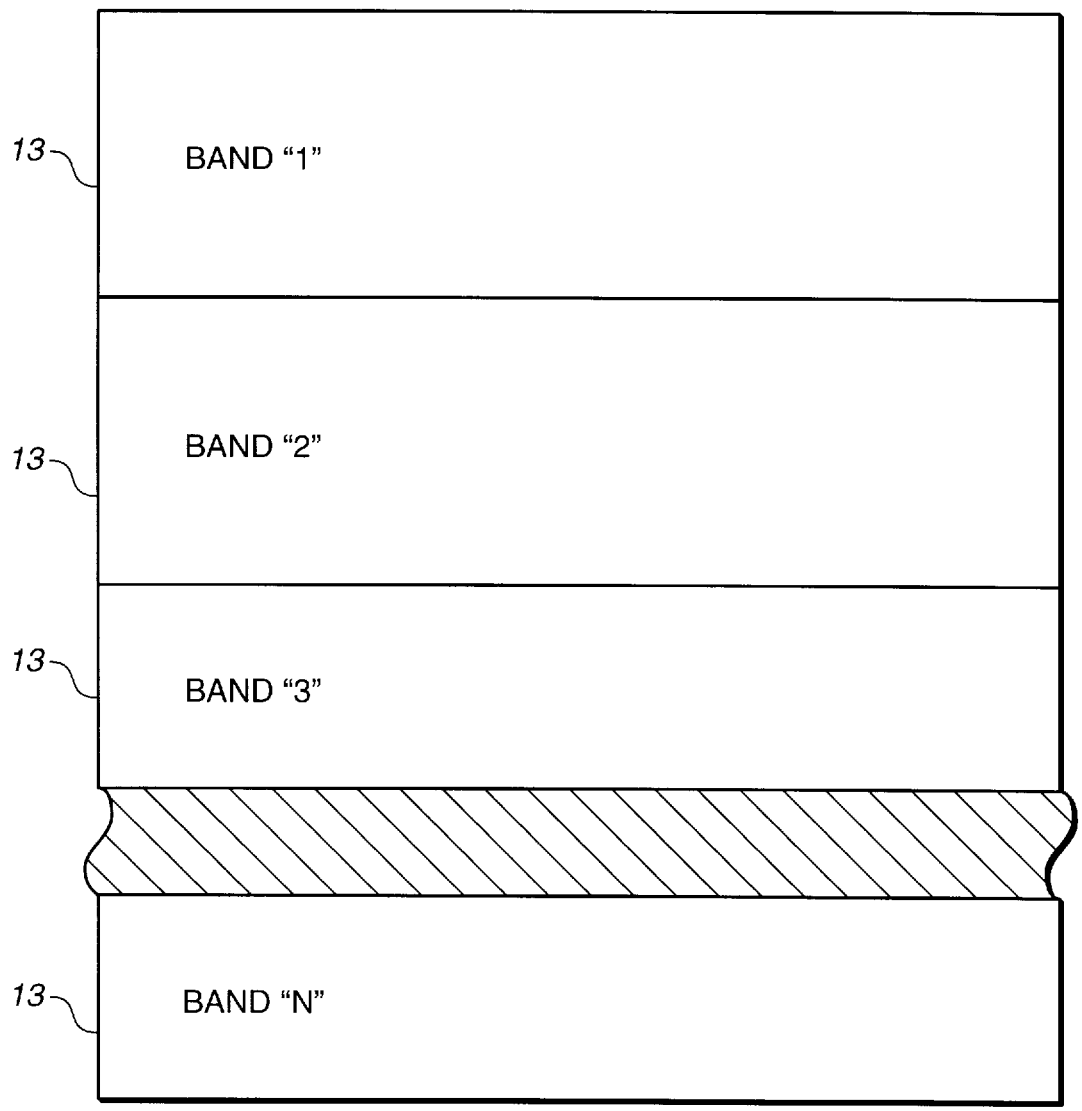
FIG._1
(PRIOR ART)

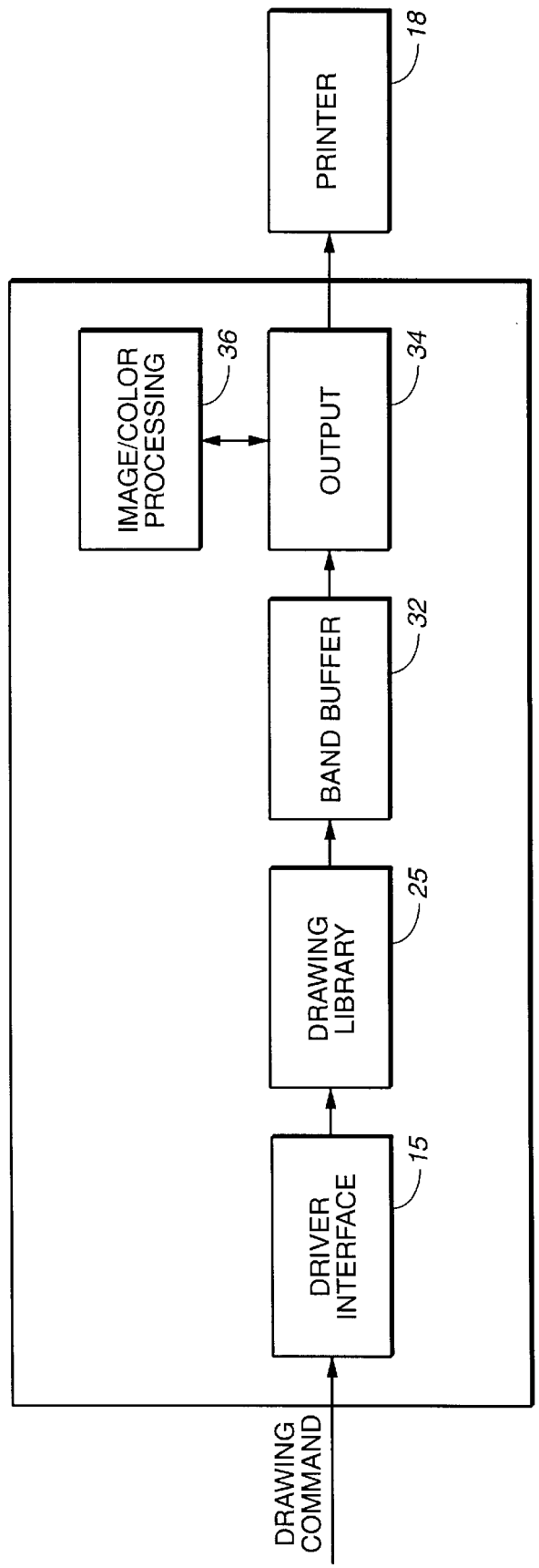
FIG._2
(PRIOR ART)

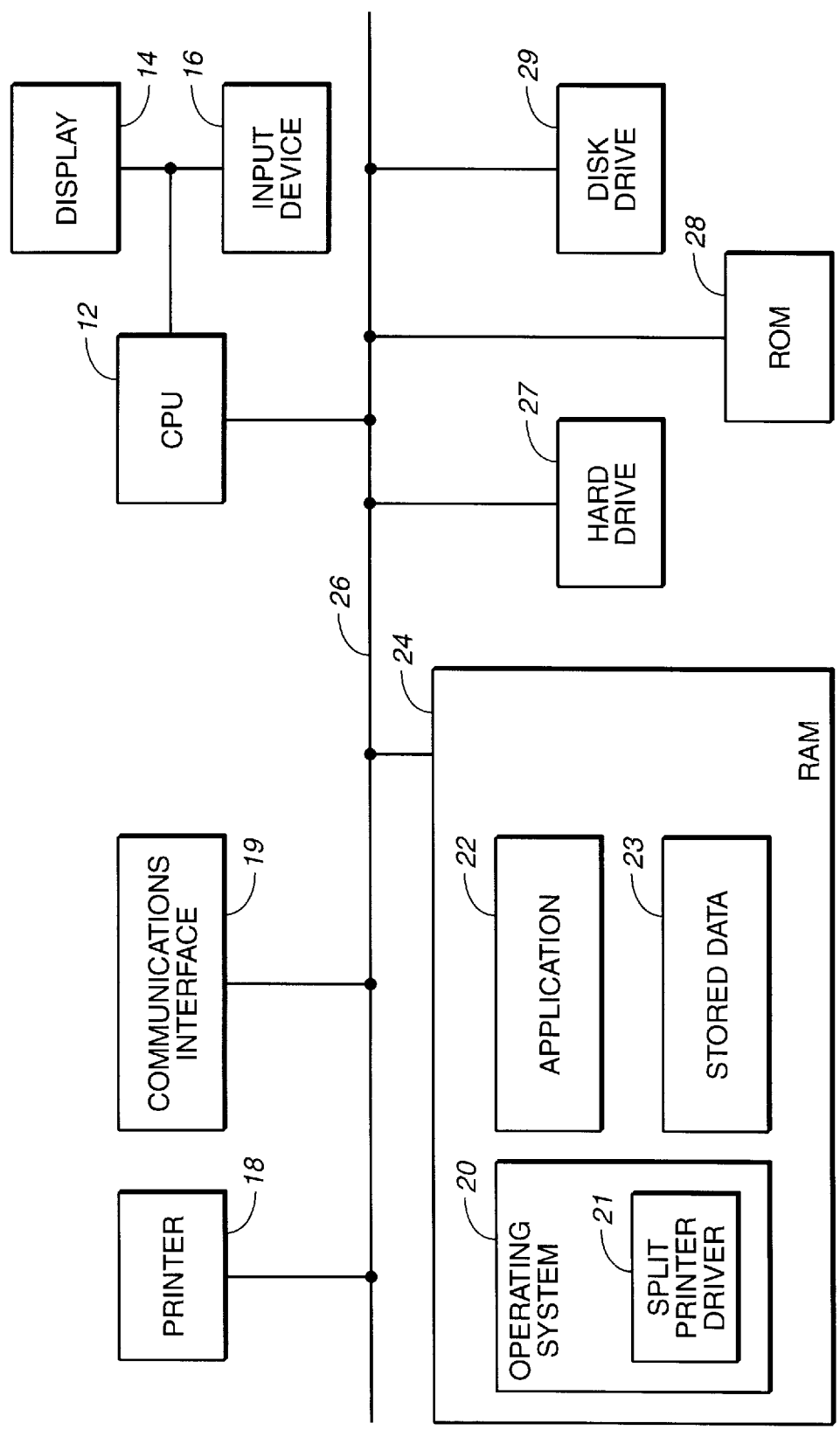
FIG._3

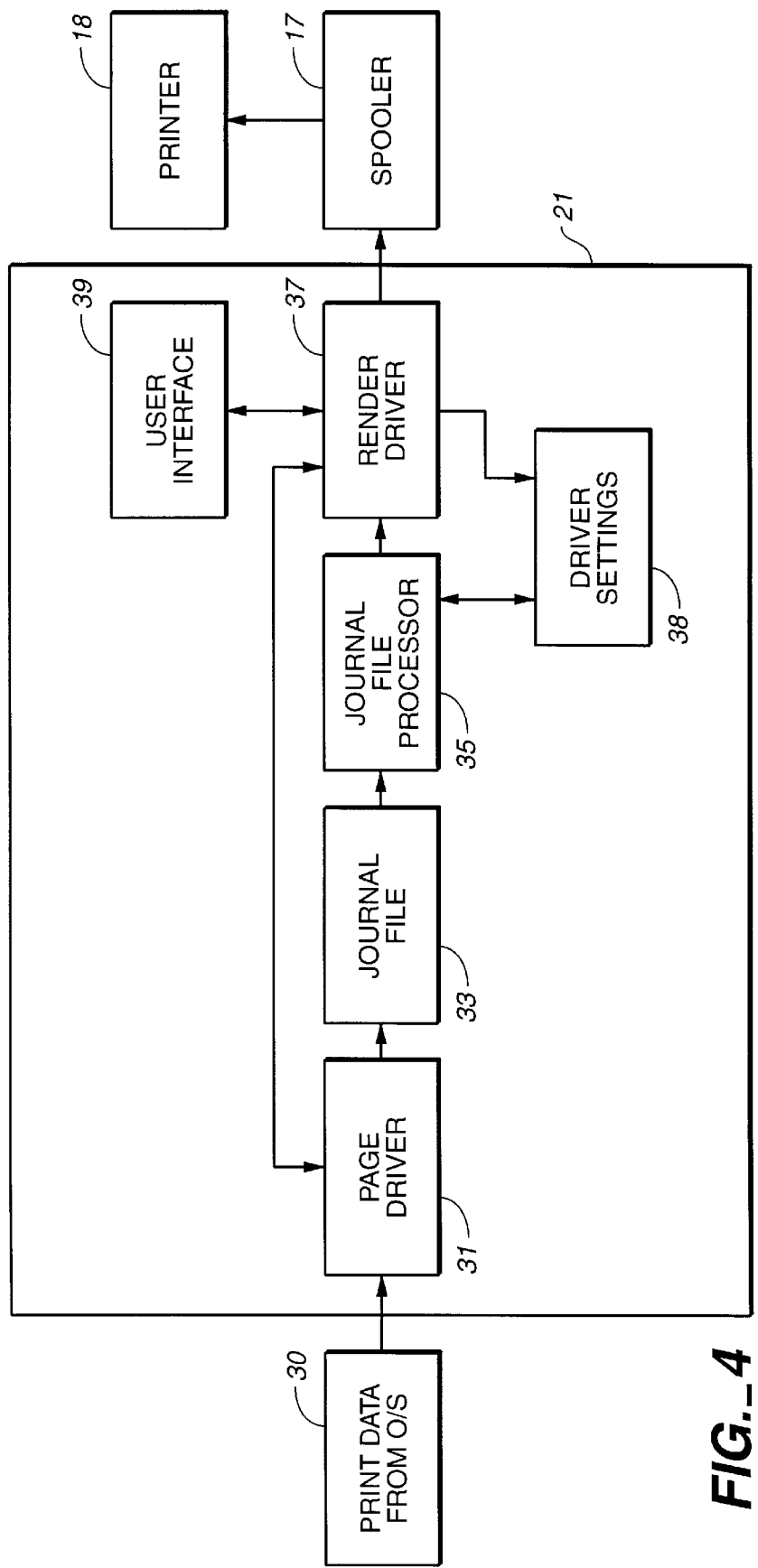
FIG._4

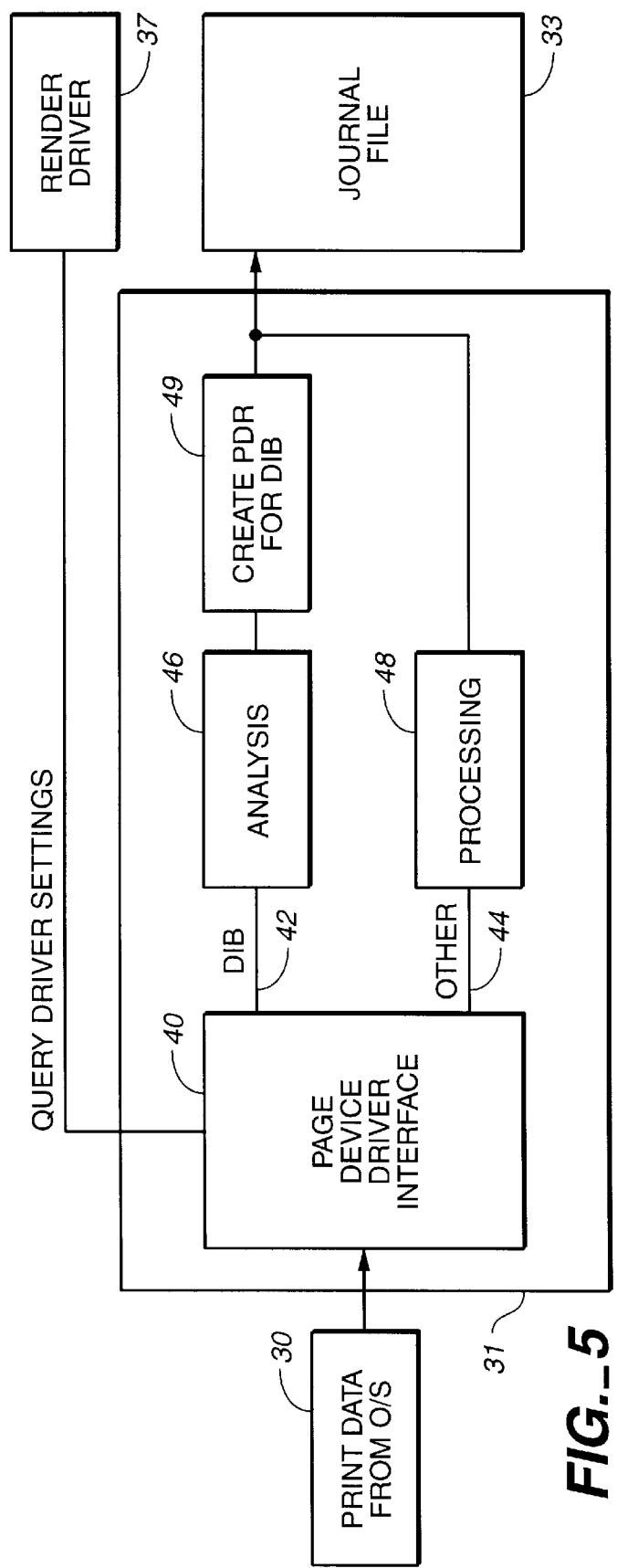
FIG._5

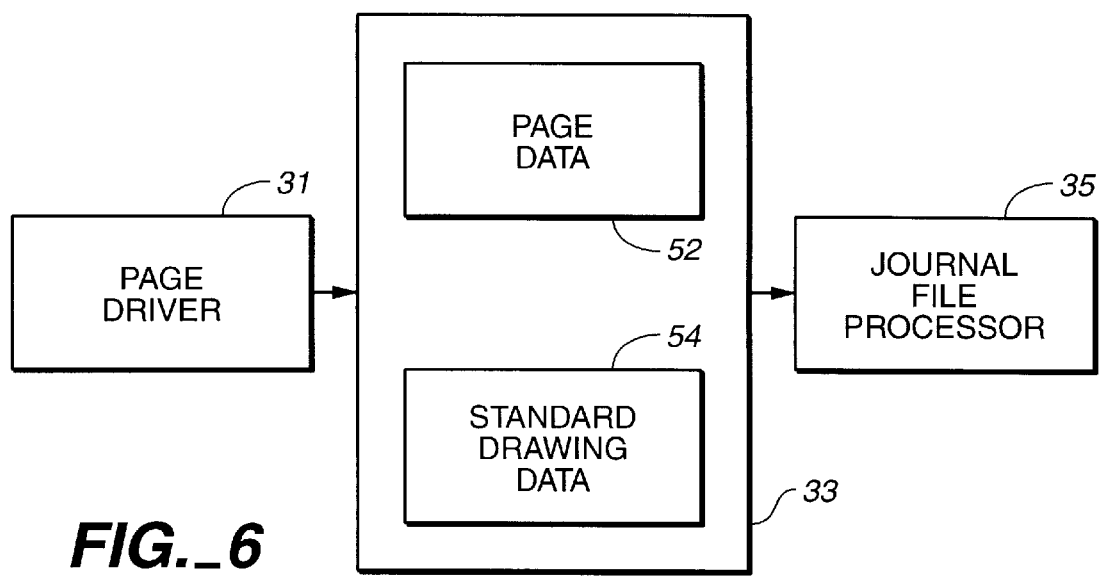
FIG._6
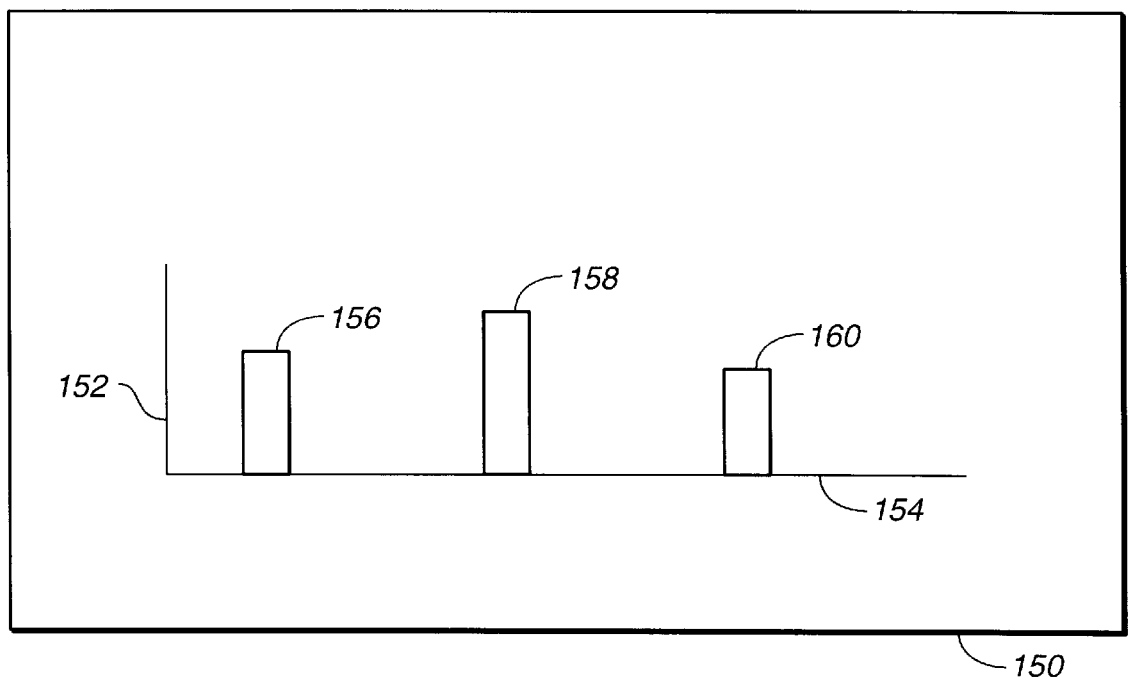
FIG._17

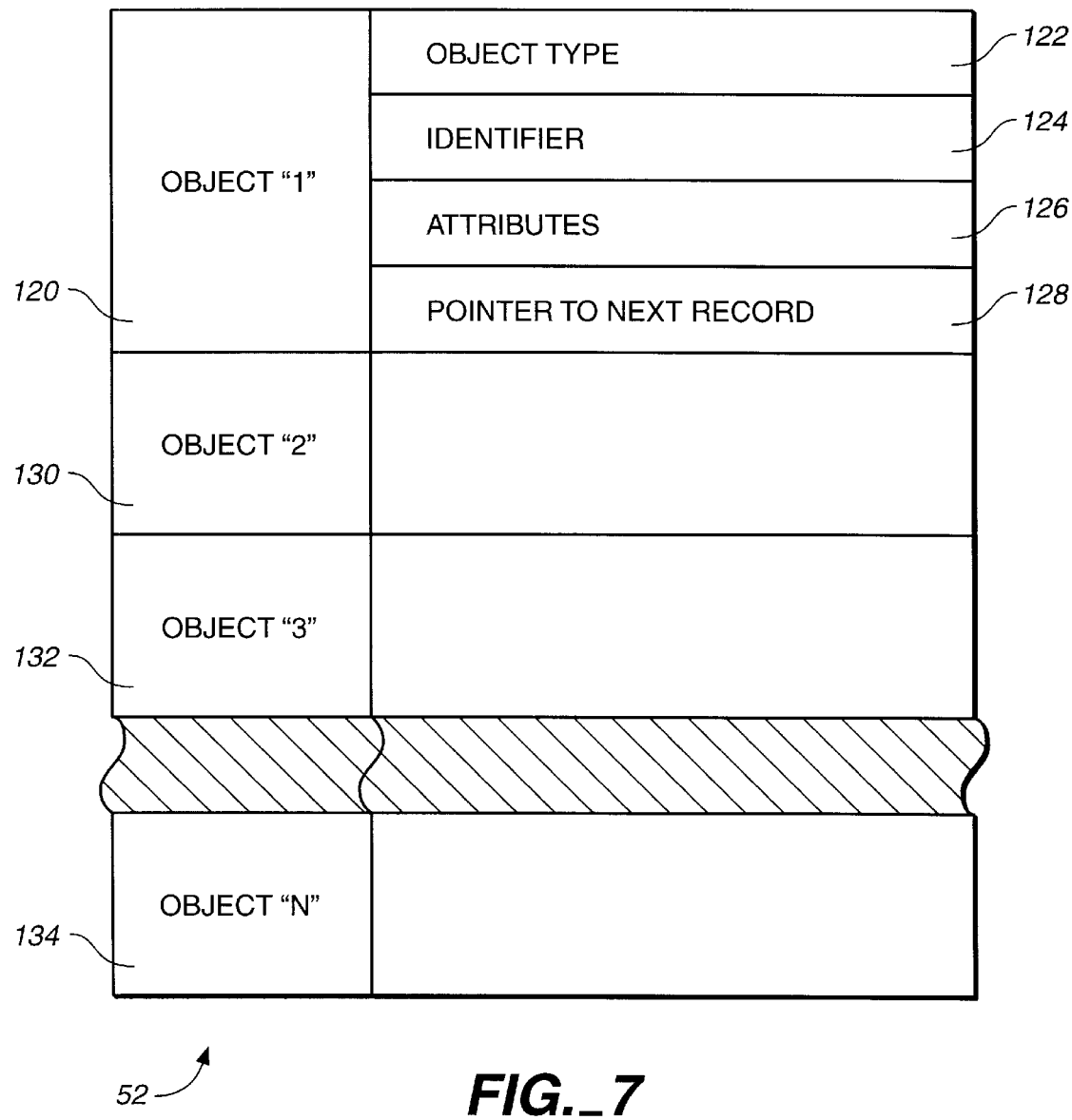
FIG._7

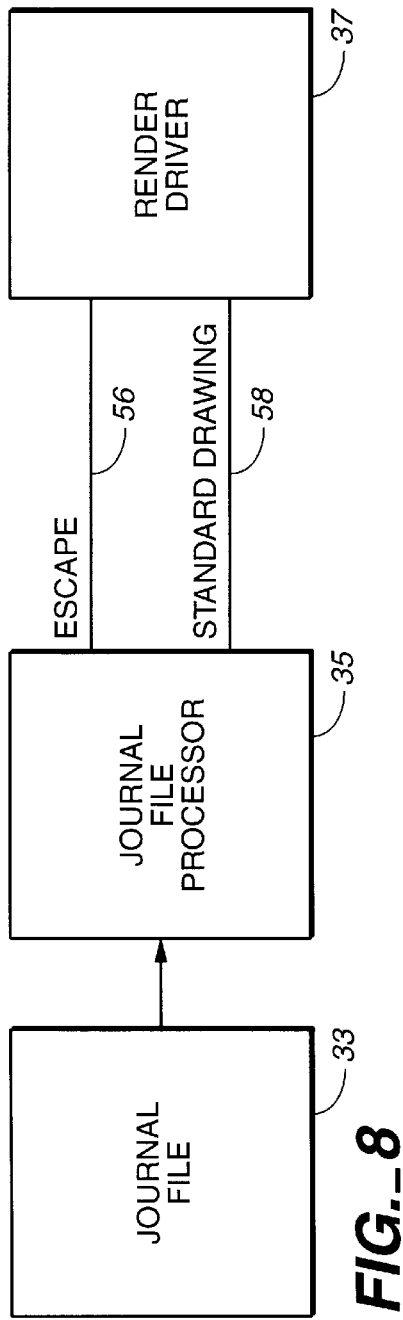
FIG._8
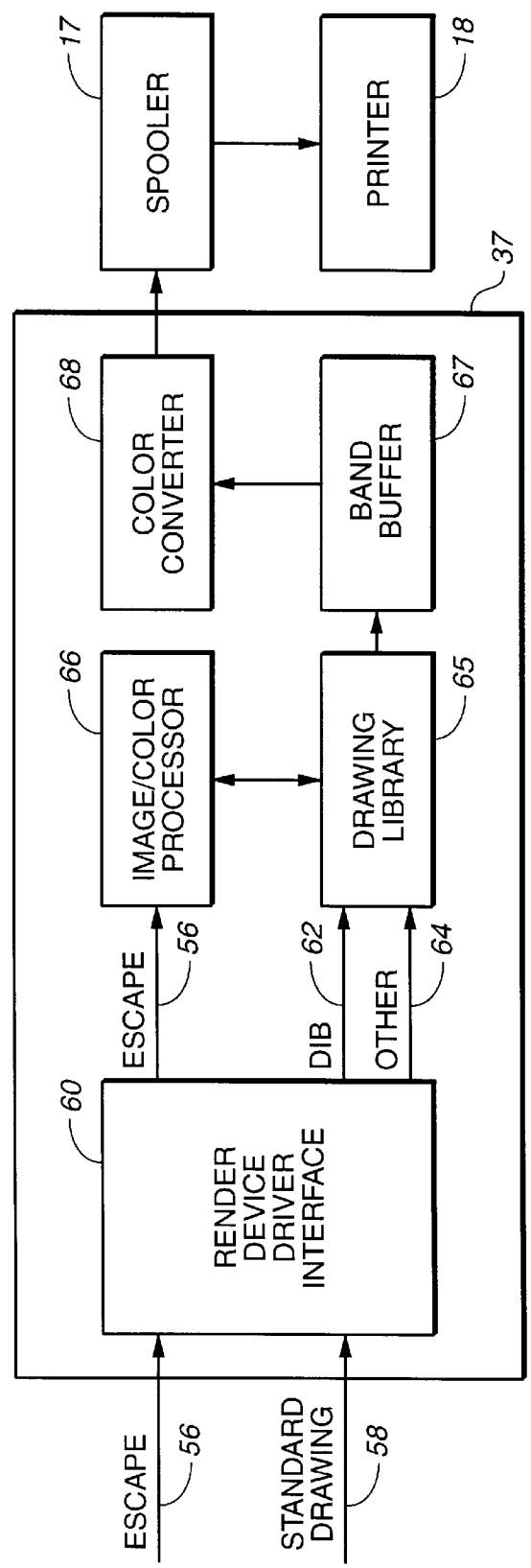
FIG._9

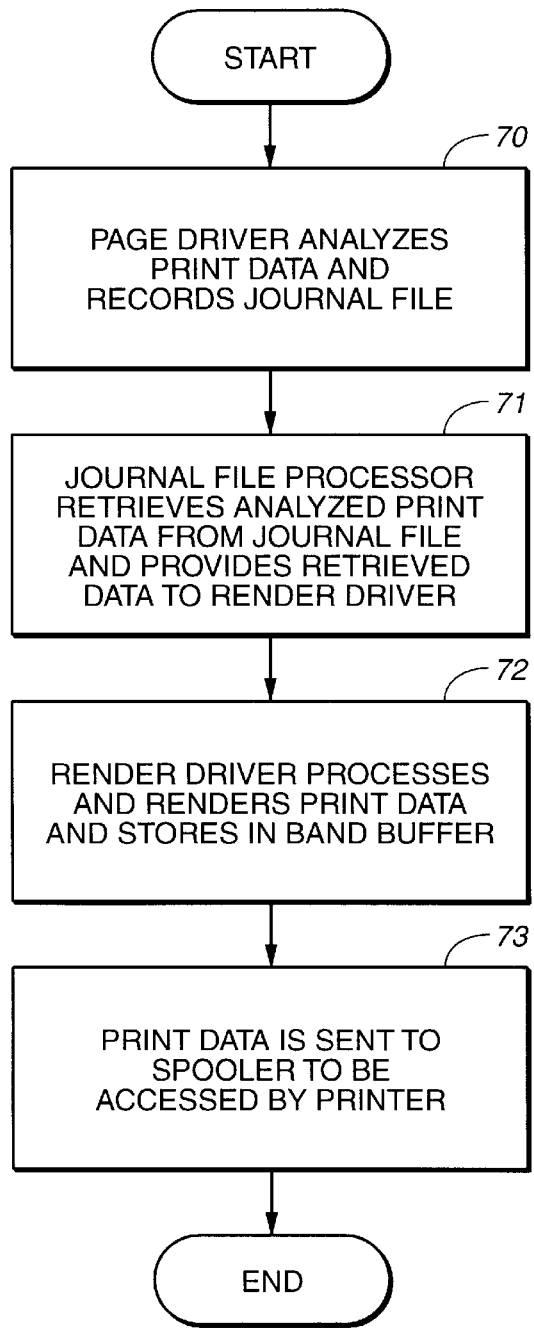
FIG._10
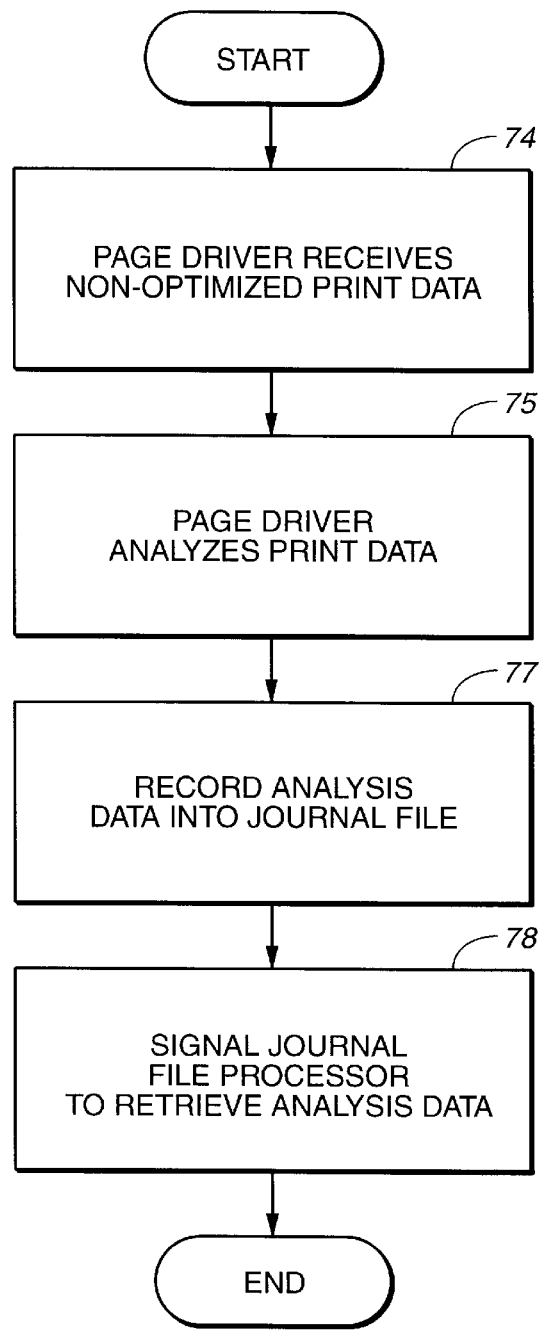
FIG._11

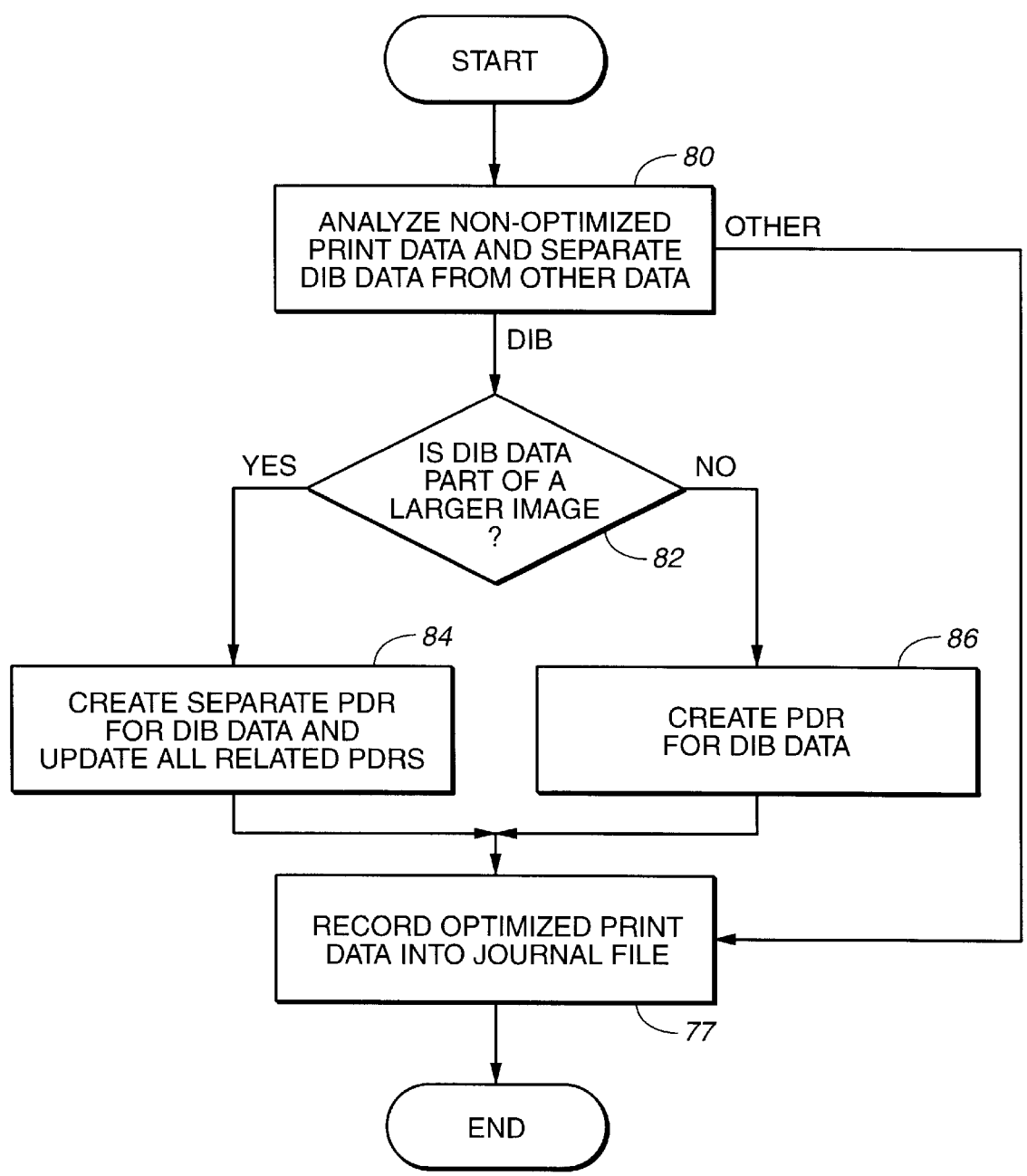
FIG._12

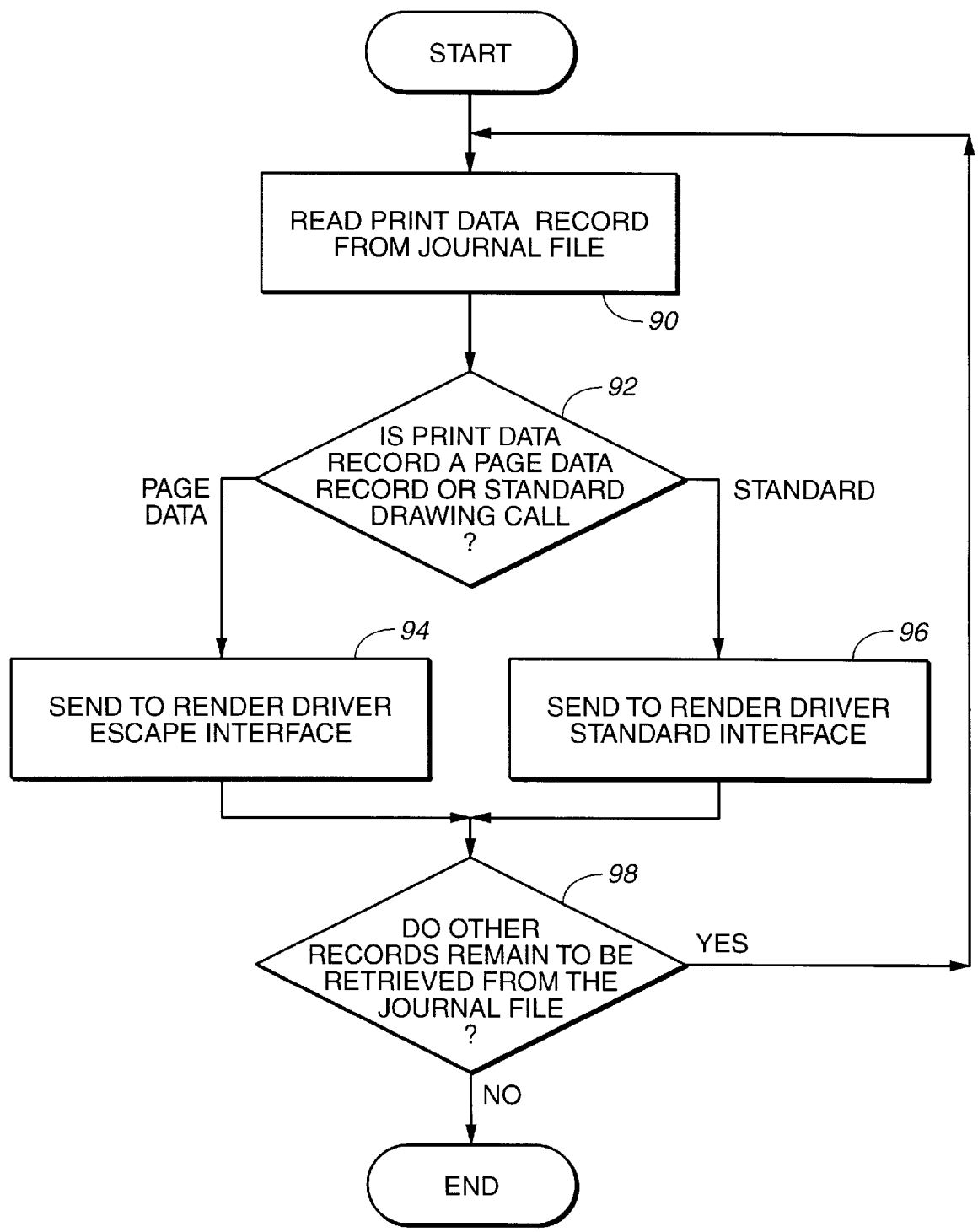
FIG._13

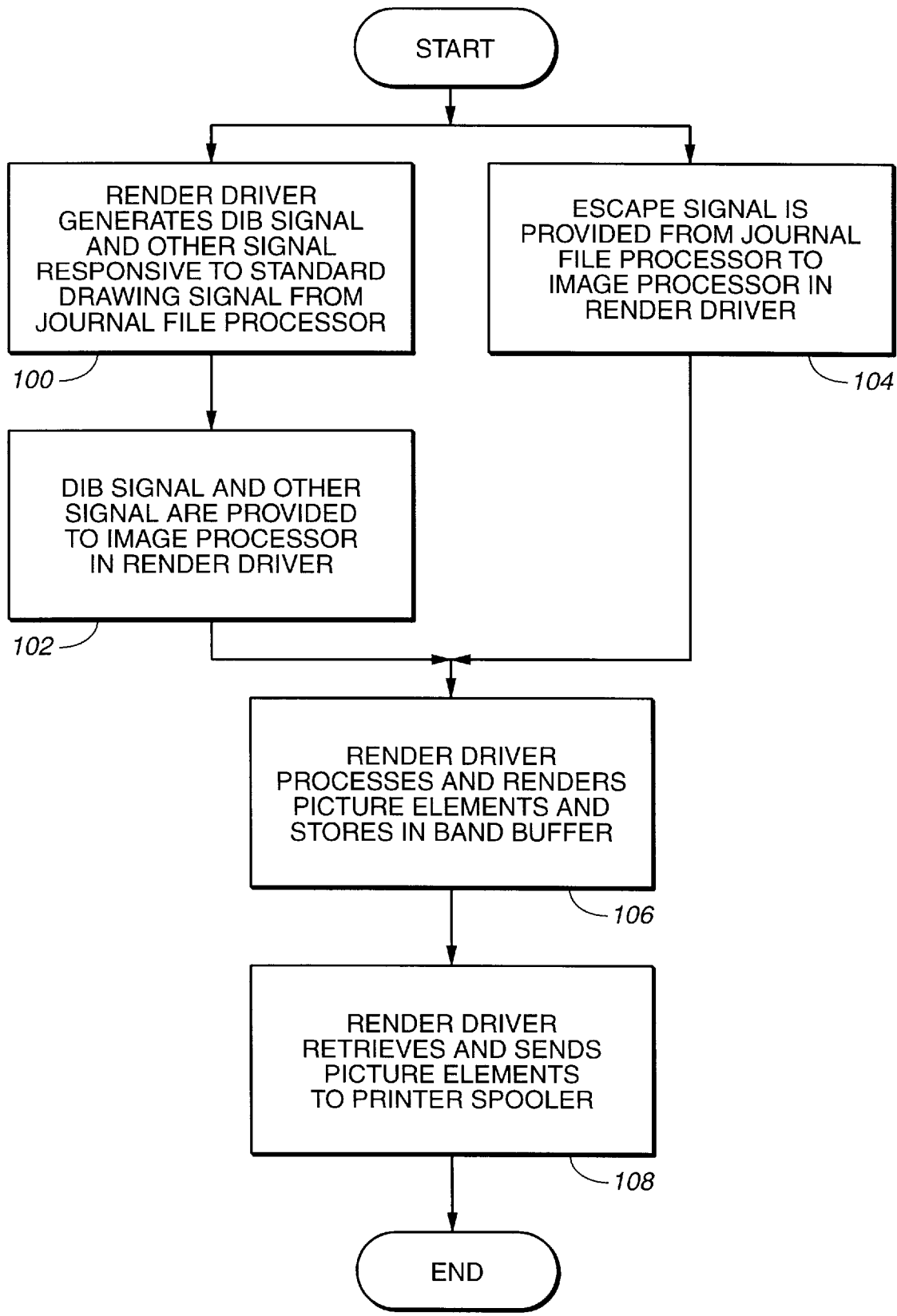
FIG._14

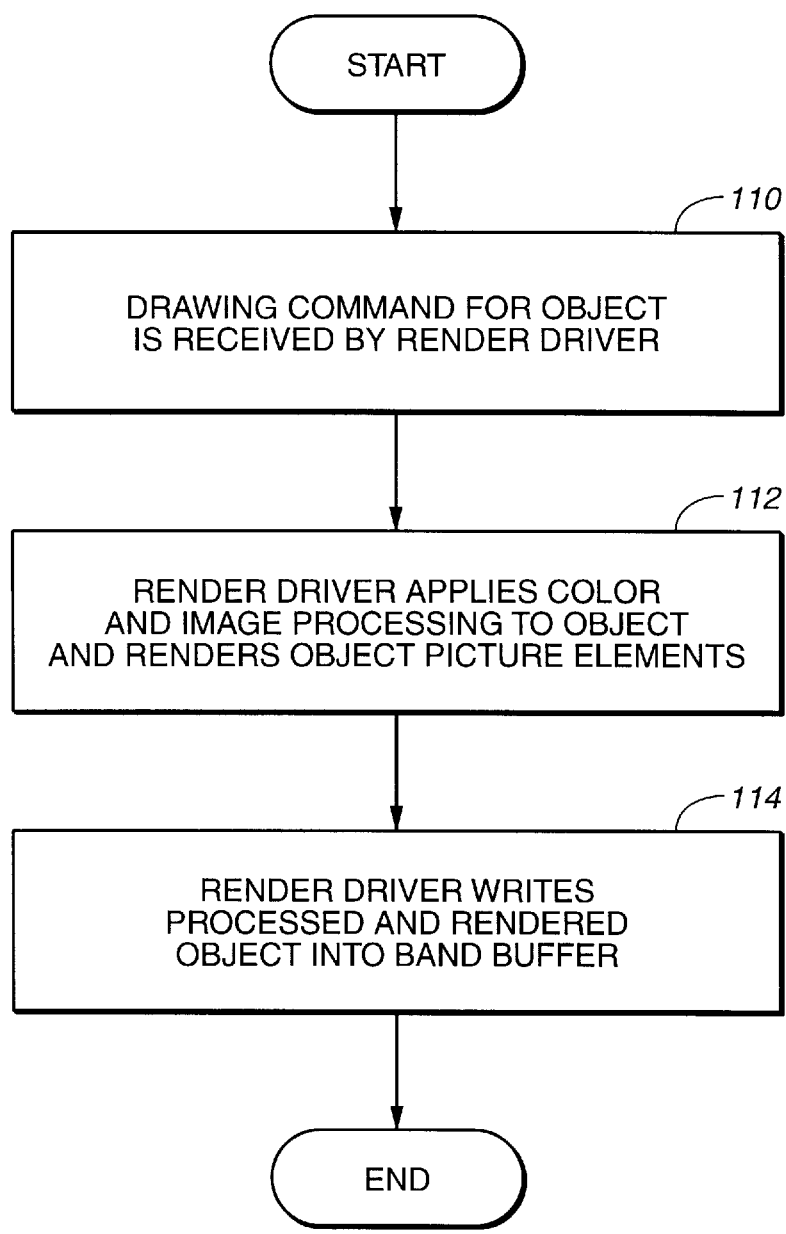
FIG._15

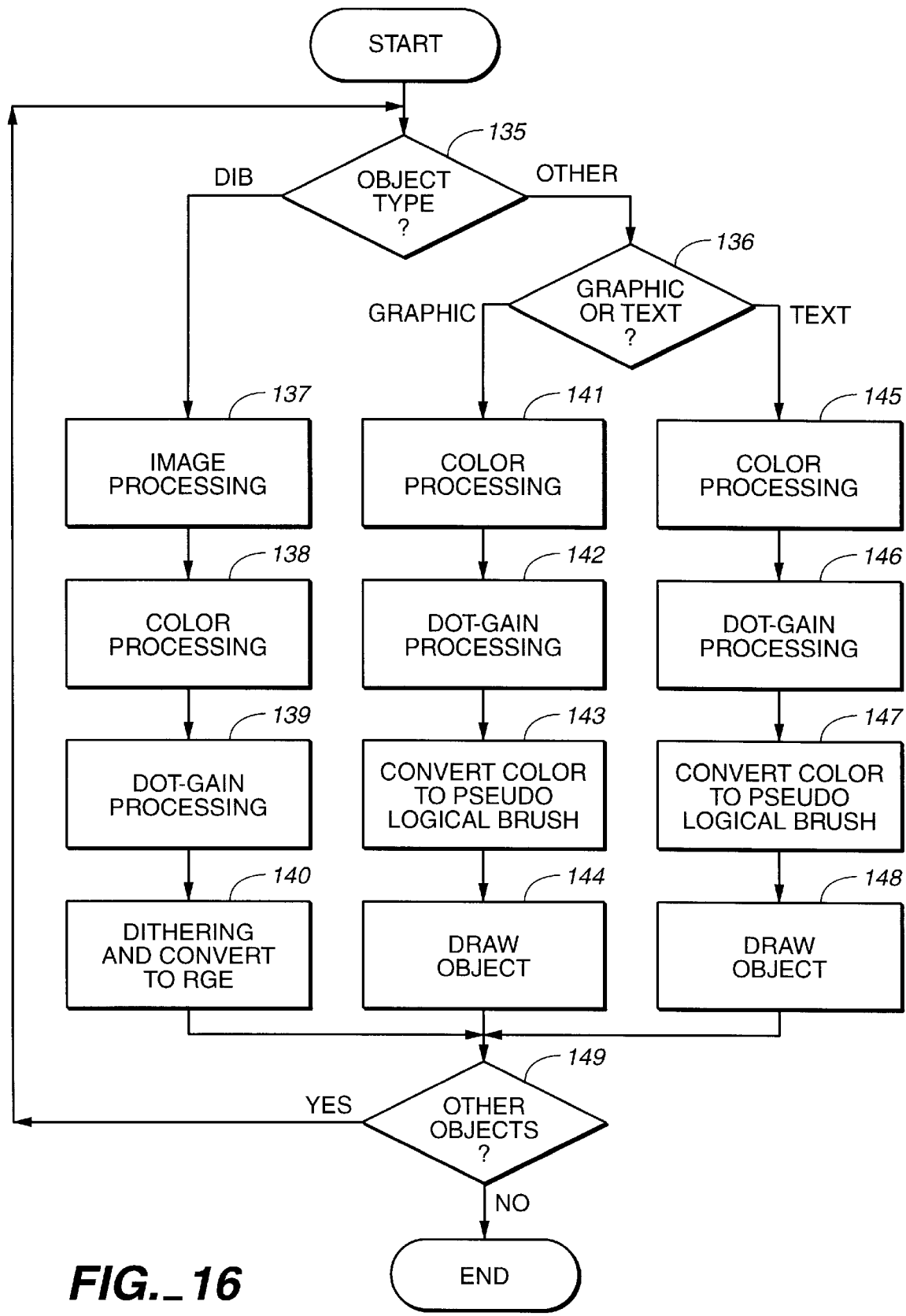
FIG._16

SYSTEM AND METHOD FOR USING VARIED BINARIZATION PROCESSING TO IMPLEMENT A PRINTER DRIVER ARCHITECTURE

This is a continuation of co-pending application Ser. No. 08/573,019 filed Dec. 15, 1995.

REFERENCE TO PROVISIONAL APPLICATIONS TO CLAIM PRIORITY

This application claims priority in provisional applications both filed on Nov. 1, 1995, the first entitled "Printer Driver Architecture for Reducing Band Memory," Ser. No. 60/007,191, by inventors Gregory A. LeClair and Kazuo Nakamura, and the second entitled "Printer Driver Architecture Using Varied Binarization Processing," Ser. No. 60/007,183, by inventors Gregory A. LeClair and Kazuo Nakamura.

CROSS-REFERENCE TO RELATED APPLICATIONS

This application is related to co-pending applications, the first application entitled "System And Method Using A Split Printer Driver To Control A Computer Printer Device" filed on Oct. 31, 1995, Ser. No. 08/550,749, by inventors Gregory A. LeClair and Kazuo Nakamura, the second application entitled "Computer Calibration Of A Color Print Image Using Successive Refinement" filed on Oct. 31, 1995, Ser. No. 08/550,915, by inventor Gregory A. LeClair, and the third application entitled "Printer Driver Architecture For Reducing Band Memory" filed on Dec. 15, 1995, Ser. No. 08/573,021, by inventors Gregory A. LeClair and Kazuo Nakamura. The subject matter of the three related applications described above is hereby incorporated by reference. These related applications are commonly assigned to Seiko-Epson Corporation of Japan.

BACKGROUND OF THE INVENTION

1. Field of the Invention

This invention relates generally to printer driver architectures and relates more particularly to a system and method for using varied binarization processing to implement a printer driver architecture and thereby produce high-quality printed images.

2. Description of the Prior Art

Producing high-quality printed images using computer systems is an important goal of many computer users as well as computer system manufacturers. The computer printer and the printer driver are critical elements in achieving high-quality printed images. Printer driver software and associated hardware receive print data from a host computer system and provide the print data to a peripheral printer in the appropriate format.

As computer technology has become more sophisticated, the demand for computer printers with higher resolution and greater color reproduction capability has also increased. Higher resolution and greater color capacity typically require large amounts of computer memory and long computer processing times. These technological demands of high-resolution color printing frequently impair printing job throughput and impact negatively on computer system performance. Implementation of computer printing devices has thus become a significant consideration in achieving optimal computer system performance.

Attempts to produce high-quality printed images using computer systems have conventionally taken several approaches. One previous computer system provides print data to the printer driver in one-page increments. Another previous computer system utilizes a banding architecture and divides a print data page into increments called "bands" which are provided to the printer driver. FIG. 1 shows a prior art sample print data page 11 which is divided from top to bottom into horizontal strips corresponding to print data bands 13. The printer driver can thus process and render an incremental portion or band 13 of print data page 11 rather than processing and rendering the entire print data page 11 as an indivisible unit. A conventional color print data page 11 having 720 dots-per-inch and 24 bits-per-pixel may contain over 130 megabytes of data and require a large amount of RAM or hard disk drive space, so subdividing print data page 11 into bands 13 allows the printer driver to process and render the print data in a more efficient and manageable format. The size of band 13 may typically range from one to one-five hundredth of print data page 11 depending upon memory constraints of the host computer system.

During the printing process, the printer driver performs a series of discrete functions such as analyzing and processing the print objects and rendering the print objects into picture elements. Previous computer systems typically use an "all-or-nothing" printer driver approach to process and render print objects. FIG. 2 shows a conventional printer driver in which a driver interface 15 receives a drawing command and print data in response to a print command from a system user. The print data typically includes various types of print objects including bitmaps, graphics and text. Driver interface 15 provides the various print objects to drawing library 25 which combines the print objects into common bands and then stores the bands into band buffer 32. Output 34 receives the bands and image/color processing 36 is applied to each of the common bands before they are sent to printer 18 to produce printed images.

This "all-or-nothing" approach frequently results in less than optimal performance when confronted with the heightened technological demands of printing high-resolution color images. Specialized image and color processing of different print object types becomes difficult because print objects are merged together into common bands prior to image processing and each band is processed as a unit without regard to individual object type. Therefore, an improved system and method for using a varied processing technique to implement a printer driver architecture is needed to produce high-quality printed images according to the present invention.

SUMMARY OF THE INVENTION

In accordance with the present invention, a system and method for using varied binarization processing to implement a printer driver architecture is disclosed. In the preferred embodiment of the present invention, a computer system comprises a split printer driver and a printer device for producing high-quality printed images responsive to print data provided by the computer operating system.

The split printer driver includes a separate page driver which performs a preliminary analysis procedure on the print data and then stores the analysis data into a journal file. A journal file processor retrieves the analysis data from the journal file and supplies it to a separate render driver which is a part of the split printer driver. The separate render driver receives the analysis data from the journal file processor and processes the print data using a varied binarization processing which depends upon the type of analysis data obtained by the page driver and stored in the journal file. In particular, the analysis data typically includes object types and attributes of print objects within the print data. The render driver then renders the processed print data into picture elements having a reduced pixel depth to conserve memory space and stores the picture elements into a band buffer. The picture elements are then provided to a spooler accessible by a printer to produce high-quality printed images.

The preferred embodiment of the present invention also comprises a multi-tasking operating system capable of concurrently operating the separate page driver to analyze and store the print data, and operating the separate render driver to process and render the print data into picture elements. The concurrent operation of the page driver functions and the render driver functions using a multi-tasking computer operating system creates a more time-efficient computer printing system and effectively increases printer throughput.

BRIEF DESCRIPTION OF THE DRAWINGS

FIG. 1 is a prior art schematic diagram showing a banding architecture conventionally used to configure print data;

FIG. 2 is a prior art block diagram showing the implementation of a conventional printer driver;

FIG. 3 is a block diagram showing a computer system with a split printer driver according to a preferred embodiment of the present invention;

FIG. 4 is a block diagram showing the elements of the split printer driver of FIG. 3;

FIG. 5 is a block diagram showing the page driver of the split printer driver of FIG. 4;

FIG. 6 is a block diagram showing the contents of the split printer driver journal file of FIG. 4;

FIG. 7 is a diagram showing a typical memory configuration of page data stored into the journal file by the page driver;

FIG. 8 is a block diagram showing the journal file processor read-mode according to a preferred embodiment of the present invention;

FIG. 9 is a block diagram showing the render driver of the split printer driver of FIG. 4;

FIG. 10 is a flowchart showing an overview of the basic process steps used by the split printer driver to produce high-quality printed images;

FIG. 11 is a flowchart showing process steps for print data acquisition, analysis, and storage by the page driver;

FIG. 12 is a flowchart showing detailed process steps for analyzing and storing print data by the page driver;

FIG. 13 is a flowchart showing journal file processor steps for reading analyzed print data from the journal file and providing the analyzed print data to the render driver;

FIG. 14 is a flowchart showing an overview of render driver steps for processing and rendering picture elements and providing the picture elements to a printer;

FIG. 15 is a flowchart showing render driver steps for processing and rendering a print object into picture elements and writing the print object into the band buffer;

FIG. 16 is a flowchart showing detailed render driver steps for using varied binarization processing; and FIG. 17 is a drawing of a print job example including a model bar-chart graphic.

DETAILED DESCRIPTION OF THE PREFERRED EMBODIMENT

A system and method are disclosed for using varied binarization processing to implement a printer driver architecture. The varied binarization processing is performed using computer software and associated hardware, and uses a page driver to analyze print data, a journal file for storing the analysis information, a journal file processor for retrieving the analysis information, and a render driver for variably processing and rendering the print data into picture elements depending on print object type and attributes. The render driver also merges the processed print objects into bands which are stored in a band buffer and then supplied to a computer printer to produce high-quality printed images.

FIG. 3 is a block diagram of a computer system 10 having a split printer driver 21 according to a preferred embodiment of the present invention. Computer system 10 preferably comprises a central processing unit (CPU) 12, a video display 14, an input device 16, a printer 18, a communications interface 19, a random-access-memory (RAM) 24, a hard drive 27, a read-only-memory (ROM) 28, and a disk drive 29. RAM 24 contains an operating system (O/S) 20, an application program 22, and stored data 23. Each element of computer system 10 preferably has an input and an output coupled to a common system bus 26. Computer system 10 may alternatively include various input devices to input information and to interface with various components of system software. Split printer driver 21 resides as part of O/S 20 within RAM 24, and is used by system 10 to control printer 18 and produce high-quality printed images, according to the present invention.

Components of this invention may be conveniently implemented using a conventional general purpose digital computer system 10 programmed according to the teachings of this specification, and appropriate software coding can be readily prepared based on teachings of the present disclosure. The present invention may also be implemented by the preparation of application-specific integrated circuits or by interconnecting an appropriate network of conventional circuits. In the preferred embodiment of the present invention, the split printer driver 21 may take the form of interdependent threads executing on a general purpose computer system 10. These threads permit the system 10 to carry out a split printer driver 21 technique when the system 10 reads and executes their corresponding programming instructions from a computer-readable storage medium. The storage medium containing the thread instructions can include, but is not limited to, any type of disk media including floppy disks, optical disks, CD-ROMs, magneto-optical disks, hard drives or disk arrays, whether located within or external to the processing system. Alternately, the storage medium can include ROM, RAM, EPROM, EEPROM, flash EEPROM or any other type of media suitable for storing computer-readable instructions.

FIG. 4 is a block diagram showing elements of split printer driver 21 according to a preferred embodiment of the present invention. Due to the subdivided structure of the split printer driver 21, the present invention is conducive to design modularity and distribution of printer driver functions such as print data processing. Separating the printer driver 21 into discrete functions also facilitates the use of a multitasking approach to printer control, where an operating system capable of supporting multitasking operations can control several printer driver functions concurrently, thus saving computing time and increasing throughput of print data. The split printer driver 21 also performs a valuable "look ahead" function by causing the page driver 31 to analyze print data 30. The analysis information is provided to render driver 37 in order to allow varied processing and rendering of the picture elements with advance information about the ultimate desired print image. This "look ahead"

feature permits split printer driver 21 to function more efficiently and helps produce high-quality printed images, as discussed with reference to FIG. 9.

In FIG. 4, page driver 31 receives print data 30 from the host computer operating system in response to a print command from the system user. Page driver 31 analyzes print data 30 in one-page units and stores the analysis data with all drawing commands into journal file 33. Journal file 33 then contains a collection of drawing commands and analysis data required to render pages of original print data 30.

Journal file processor 35 retrieves the analysis data from journal file 33 and provides the analysis data to render driver 37. Journal file processor 35 is also responsive to a set of driver settings 38. Examples of driver settings 38 include print-image resolution, color printing selection, paper type, imageable print area, and various specific printer options. The initial driver settings 38 are provided by render driver 37 and may be subsequently updated by journal file processor 35.

Render driver 37 is connected to user interface (UI) 39 and maintains control over driver settings 38. Render driver 37, however, may indirectly call page driver 31 responsive to a request to post the UI 39. UI 39 essentially contains controls enabling a system user to select specific printer functions and options.

Journal file processor 35 provides analysis data retrieved from journal file 33 to render driver 37 which processes and renders the print data into picture elements responsive to the analysis data. Render driver 37 then provides the rendered picture elements to a printer spooler 17 which printer 18 accesses to produce printed images.

FIG. 5 is a block diagram showing page driver 31 of the split printer driver 21 of FIG. 4. In FIG. 5, print data 30 is provided by the host computer operating system 20 to page driver 31 in response to a print command from the system user. Page device driver interface (DDI) 40 receives and separates print data 30 into high-quality device-independent bitmap (DIB) data 42 and other data 44 which includes basic text and graphic primitives. Page DDI 40 also has the ability to query driver settings from render driver 37, including print resolution, paper size, color print selection, or printer options.

In the preferred embodiment, DIB data 42 and other data 44 are analyzed before being stored in journal file 33. The analysis process allows page driver 31 to perform preliminary print data processing and formatting before storing the print data in journal file 33. Specifically, page driver 31 develops a data base collection for each print object within a print image and arranges the print objects in the correct order, including any necessary pointers or tags, before storing the analyzed print data in journal file 33. Since the print data 30 has been previously analyzed by page driver 31, a straightforward read-function can be used at print data retrieval time.

Other data 44 is processed in block 48 and then stored in journal file 33. DIB data 42 is analyzed in block 46 to determine object type and important attributes such as color information. DIB data 42 is also analyzed to determine whether the analyzed image is part of a larger image. If analysis in block 46 reveals that the analyzed image is part of a larger image, a identifier is added to link the related analyzed DIB data 42 before it is stored into a page data record (PDR) in block 49. If analysis 46 reveals that the analyzed image is not part of a larger image, the analyzed DIB data 42 is identified and stored into a PDR in block 49.

FIG. 6 is a block diagram showing the contents of the split printer driver journal file 33 according to a preferred embodiment of the present invention. Journal file 33 essentially contains encoded information differentiating print data as either page or standard data. Page data includes the analysis data provided by page driver 31 which bypasses the need to repeatedly scan standard drawing calls for analysis data, such as print object type, an identifier if the object is part of a larger image, and various print object attributes like color information and line thickness.

In FIG. 6, page driver 31 provides analyzed print data to journal file 33. Page data 52 contains a combination of commands and parameters which identify the analyzed print data including analysis data discussed in conjunction with FIG. 5 above. Standard drawing data 54 contains drawing calls for standard print jobs, for example, circle primitives, line styles, fill patterns, specifying colors, bit-block transfers, and scaling transformations. Journal file processor 35 thus reads the contents of journal file 33 and differentiates between standard drawing data 54 and page data 52.

FIG. 7 is a diagram showing a typical memory configuration of page data 52 after being stored into journal file 33 by page driver 31. Page data 52 typically includes a group of page data records (PDRs) which contain information used by the present invention to variably process and render print data 30 into high-quality images. Referring to FIG. 7, object "1" 120 corresponds to a sub-portion of print data 30 received by page driver 31 and includes the analysis information gathered by page driver 31. The FIG. 7 PDR containing object "1" 120 shows examples of information typically contained in each PDR. The type of print object which is the subject of the print job is specified by object type 122. Examples of print object type include text, device-independent bitmap (DIB), graphic and bit-block transfer. An identifier (ID) 124 is used to identify whether print object "1" 120 is part of a larger image. Various attributes 126 are included, such as color information, line thickness, a bounding rectangle for the print object, and a pointer to a corresponding standard drawing data 54 record containing print data for print object "1" 120. A pointer 128 to the next linked-list record in journal file 33 is also included in each PDR. Object "2" 130 and object "3" 132, continuing up to an object "n" 134 may also be stored as individual PDRs within page data 52 of journal file 33. Each of the PDRs typically may include an object type 122, an identifier 124, attributes 126, and a pointer 128 as discussed in conjunction with object "1" 120.

FIG. 8 is a block diagram showing the journal file processor 35 in journal file read-mode according to a preferred embodiment of the present invention. Journal file processor 35 sequentially reads records stored in journal file 33 and determines whether each record contains page data 52 or standard drawing data 54. In the preferred embodiment, page driver 31 stores each record into journal file 33 with necessary information in the correct sequence, so journal file processor 35 typically performs a straightforward read-function upon each record in journal file 33. Journal file processor 35 then transmits a escape signal 56 to render driver 37 responsive to page data 52 from journal file 33 (FIG. 6). Escape signal 56 includes analysis information from the analysis process performed by page driver 31 and stored in page data 52. Journal file processor 35 also transmits a standard drawing signal 58 to render driver 37. Standard drawing signal 58 includes the standard information stored in standard drawing data 54 within journal file 33.

FIG. 9 is a block diagram showing render driver 37 of split printer driver 21 according to a preferred embodiment of the present invention. In FIG. 9, escape signal 56 and standard drawing signal 58 are provided to render device driver interface (DDI) 60 of render driver 37. Standard drawing signal 58 is separated by render DDI 60 into high-quality device independent bitmap (DIB) data 62 and other data 64. Render DDI 60 then provides DIB data 62 and other data 64 to drawing library 65. Escape signal 56 is internally passed through render DDI 60 to image/color processor 66 for use in picture-element processing and rendering.

Maximum print quality can be obtained by understanding certain important aspects of print data 30. For example, attributes 126 stored in page data 52 within journal file 33 may be used to calculate a color gamut for a particular print job, and identifier 124 stored in page data 52 may be used to tell render driver 37 whether a particular print object is part of a larger image. The print object type 122 is obtained by page driver 31 and used by render driver 37 to perform varied binarization processing which includes image and color processing and rendering the picture elements. This page driver 31 analysis information increases print quality because prior knowledge ("look ahead") of a print object's type 122 and attributes 126 permits the image processing algorithm of the render driver 37 to function more efficiently. Various types of image processing and rendering of picture elements require information typically not provided by previous printer drivers at the beginning of the rendering process. The present invention, in contrast, has previously analyzed print data 30, and can provide this extra analysis information to render driver 37 as a "look ahead" via escape signal 56.

Image/color processor 66 accesses DIB signal 62 and other signal 64 through drawing library 65 and then uses analysis information provided via escape signal 56 to identify the object type 122 and attributes 126 of the particular image to be printed. Depending on whether the object type 122 is a DIB (device-independent bitmap), graphics or text, a varied type of binarization processing may be performed on DIB signal 62 and other signal 64. Attributes 126 analyzed by page driver 31 are also used during this varied binarization processing for image and color processing and for rendering the picture elements.

In the preferred embodiment, the picture elements typically have eight bits per pixel (bpp) for black and white images and twenty-four bpp for color images and are in a conventional RGB (Red, Green, Blue) format. During rendering, the present invention typically reduces the pixel depth by a factor of eight before storing the rendered picture elements into band buffer 67, resulting in bands of stored pixels having one bpp for black and white images and three bpp for color images. This reduction of pixel depth provides considerable memory conservation in the host computer system 10. Band buffer 67 then passes the bands of stored picture elements to color converter 68 which converts them from RGB format to a format compatible with printer 18, such as CMY (Cyan, Magenta, Yellow) or CMYK (Cyan, Magenta, Yellow, Black). The bands of converted picture elements are passed from color converter 68 to spooler 17 which is accessed by printer 18 to produce high-quality printed images.

FIG. 10 is a flowchart showing an overview of basic process steps used by the split printer driver 21 to produce high-quality printed images according to the present invention. In step 70, page driver 31 analyzes print data 30 provided by operating system 20 and records the analysis information as page data 52 into journal file 33. Journal file processor 35, in step 71, retrieves the page data 52 from journal file 33 and provides it to render driver 37. In step 72, the render driver 37 uses page data 52 to process and render picture elements which are stored into band buffer 67. The picture elements, in step 73, are sent by band buffer 67 to spooler 17 which is accessed by printer 18 to produce high-quality printed images.

FIG. 11 is a flowchart showing process steps for print data 30 acquisition, analysis, and storage by the page driver 31 according to a preferred embodiment of the present invention. Page driver 31 receives 74 non-analyzed print data 30 from a host computer operating system 20 in response to a print command issued by the system user. In step 75, the page driver 31 analyses the received print data 30 and separates high-quality device-independent bitmap (DIB) data 42 from other data 44. The analysis data and standard drawing calls, in step 77, are recorded into the journal file 33 by the page driver 31. In step 78, the page driver 31 then signals the journal file processor 35 at the end of a page of drawing commands that the analysis data is ready to be retrieved and used to process and render picture elements.

FIG. 12 is a flowchart showing detailed process steps for analyzing and storing print data 30 by the page driver 31 according to a preferred embodiment of the present invention. The FIG. 12 process presents the analyzing step (75) of FIG. 11 in greater detail. In step 80, page driver 31 performs object analysis on the print data 30 received from the host computer operating system 20 and separates the print data 30 into print object types such as high-quality, device-independent bitmap (DIB) data 42 and other data 44. The page driver 31, in step 82, determines whether the analyzed DIB data 42 is part of a larger image. If the DIB data 42 is part of a larger image, step 84 creates a separate page data record (PDR) for the DIB data 42 and updates all related PDRs to identify all related PDRs as part of a larger image. If the DIB data 42 is not part of a larger image, step 86 creates a PDR for the DIB data 42. Step 77 (FIGS. 11 and 12) records the analysis data into the journal file 33, including DIB data from steps 84 and 86 and other data from step 80. In the preferred embodiment, other data from step 80 may be analyzed or processed before being recorded into the journal file 33 during step 77.

FIG. 13 is a flowchart showing journal file processor 35 steps for reading analysis data from the journal file 33 and providing the data to the render driver 37. The journal file processor 35, in step 90, retrieves an individual print data record from the journal file 33. In step 92, the journal file processor 35 determines whether the print data record is page data 52 or standard drawing data 54. The journal file processor, in step 94, responsive to the page data 52 provides a escape signal 56 to a escape interface on the render driver 37. The journal file processor 35, in step 96, responsive to the standard drawing data 54 provides a standard drawing signal 58 to a standard interface on the render driver 37. In step 98, the journal file processor 35 determines whether other journal file records remain to be retrieved from the journal file 33. If other records remain, step 98 returns the process to step 90 and repeats the FIG. 13 process steps. If no other records remain, the FIG. 13 process is exited.

FIG. 14 is a flowchart of render driver 37 method steps for processing and rendering print data into picture elements and providing the picture elements to a printer 18. The render driver 37 generates 100 a high-quality device-independent bitmap (DIB) signal 62 and other signal 64 responsive to the standard drawing signal 58 provided by the journal file processor 35. In step 102, the render driver 37 provides the DIB signal 62 and the other signal 64 to a drawing library 65 within the render driver 37 to be accessed by image/color processor 66. In step 104, the render driver 37 provides a escape signal 56 to image processor 66 for use in variable processing and rendering of picture elements. Escape signal 56 is used to provide analysis information previously obtained and stored by page driver 31, including print object type 122 and attributes 126. The render driver 37, in step 106, variably processes and renders the print data into picture elements responsive to the analysis information provided via escape signal 56. In the preferred embodiment, the picture elements are rendered with a reduced pixel depth to save memory space, merged into bands and stored in a band buffer. In step 108, the rendered picture elements are converted to a format compatible with printer 18, sent to a printer spooler 17 which may then be accessed by a printer 18 to produce high-quality printed images according to the present invention.

FIG. 15 is a flowchart showing render driver 37 steps for variably rendering and processing a given print object into picture elements and writing the object into band buffer 67. The FIG. 15 process steps provide greater detail for step 106 of FIG. 14. In step 110, render driver 37 receives a drawing command to process and render a given print object into picture elements. Render driver 37, in step 112, applies varied color and image processing depending on object type 122 and attributes 126 provided via escape signal 56, and renders the given print object into picture elements. In the preferred embodiment, render driver 37 converts the pixel depth of the picture elements by a factor of eight, whereby eight bpp (black and white) becomes one bpp (black and white) and twenty-four bpp (color) becomes three bpp (color). Render driver 37, in step 114, then writes the processed, rendered, and converted pixels into bands stored within band buffer 67.

FIG. 16 is a flowchart showing render driver 37 steps for using varied binarization processing to apply color and image processing to a given print object and then to render the given print object into picture elements. FIG. 16 provides greater detail for process step 112 of FIG. 15. In step 135, render driver 37 identifies a given print object by accessing its object type 122 via escape signal 56 which is provided to image/color processor 66. Object type 122 was previously identified (step 75) by an analysis process performed by page driver 31 which stored the analysis information including object type 122 and attributes 126 into journal file 33. In the preferred embodiment, object type 122 may comprise device-independent bitmap (DIB) objects and other non-DIB objects including graphics and text.

The present invention performs varied binarization processing upon a given print object depending upon object type 122. For example, a DIB print object may receive processing which is different from that of a graphic print object or a text print object. Since object type 122 has previously been identified and is accessible before render driver 37 begins processing and rendering the picture elements, the present invention essentially uses a "look ahead" analysis of a given print object to enable render driver 37 to use the most effective types of image and color processing. The varied processing steps of FIG. 16 represent one embodiment of the present invention, however other processing steps and sequences may be used in alternative embodiments.

If a print object is identified as a device-independent bitmap (DIB), then image/color processor 66 performs image processing in step 137, including edge enhancement, color balancing and image sharpening. In addition to object type 122, image/color processor 66 processes the print object using other page data 52 provided via escape signal 56, including attributes 126 such as color information, line thickness and a bounding rectangle for the print object. In step 138, image/color processor 66 performs color processing on the print object also using the page data 52 provided via escape signal 56. In step 139, render driver 37 performs dot-gain processing on the print object using an inverse dot-gain transform which applies a negative bias to adjust the amount of printer ink used for individual pixel dots. Render driver 37, in step 140, performs a dithering process which converts the processed print object into a RGB (Red, Blue, Green) format and renders the processed print object into picture elements. In the preferred embodiment, the rendering process conserves memory by converting the print object pixel depth from 8 bits per pixel (bpp) to 1 bpp (black and white) and from 24 bpp to 3 bpp (color). The conversion process is performed with a dithering algorithm using error coefficients and interpolation to convert absolute or indexed pixel color values to a bi-level (on or off) planar (one plane for each RGB color component) pixel matrix.

If render driver 37 identifies a print object as being other than a device-independent bitmap (DIB), image/color processor 66, in step 136, determines whether the print object is a graphic print object or a text print object by accessing its object type 122 via escape signal 56. If step 136 identifies a graphic print object, image/color processor 66, in step 141, performs color processing using page data 52 including attributes 126 provided via escape signal 56. In step 142, render driver 37 performs dot-gain processing on the graphic print object using an inverse dot-gain transform as discussed above in conjunction with step 139. In step 143, render driver 37 converts the parameters of the print-object color data to a pseudo-logical brush pattern. Preferably, a pseudo-logical brush pattern is a bit-map having a variable bit size which is definable depending on the requirements of the particular print object and may contain other attributes such as overwrite transparency. Typically, more print colors become available as the brush pattern size increases, however, a trade-off exists since the spatial print resolution becomes finer as the brush pattern size decreases. Therefore, brush pattern size may be selected depending on object type 122 provided via escape signal 56. For example, to fill a large rectangle, a large brush pattern may be appropriate since resolution is not as critical, and a wide range of saturated colors may be useful. Conversely, when printing text having fine edges and small point sizes, a small brush pattern may be better suited to provide fine spatial resolution, especially since text typically does not require a wide range of color choices. In step 144, render driver 37 draws and renders the processed graphic print object into picture elements. In the preferred embodiment, the rendering process conserves memory by converting the print object pixel depth from 8 bpp to 1 bpp (black and white) and from 24 bpp to 3 bpp (color).

If step 136 identifies a text print object, image/color processor 66, in step 145, performs color processing using page data 52 including attributes 126 provided via escape signal 56. In step 146, render driver 37 performs dot-gain processing on the text print object using an inverse dot-gain transform as discussed above in conjunction with step 139. In step 147, render driver 37 converts the parameters of the print-object color data to a pseudo-logical brush pattern as discussed above in conjunction with step 143. In step 148, render driver 37 draws and renders the processed text print object into picture elements. In the preferred embodiment, the rendering process of step 148 conserves memory by converting the print object pixel depth from 8 bpp to 1 bpp (black and white) and from 24 bpp to 3 bpp (color). In step 149, render driver 37 determines whether other print objects remain to be processed. If print objects remain, step 149 repeats the FIG. 16 process beginning with step 135, and if no print objects remain, the FIG. 16 process is ended.

FIG. 17 is a drawing of a sample print job consisting of a model bar chart 150 which will serve as an example to illustrate the basic operation of varied binarization processing by split printer driver 21. Model bar chart 150 comprises at least five separate print objects, including a vertical y axis 152, a horizontal x axis 154, a first bar 156, a second bar 158, and a third bar 160.

In the preferred embodiment, when a system user issues a command to print model bar chart 150, operating system 20 provides the corresponding bar-chart print data 30 to page driver 31 of split printer driver 21. The format of print data 30 depends primarily upon the host computer system 10 and its operating system 20. Typically, print data 30 will either be in page format, where print data 30 is provided to page driver 31 in one-page increments, or in a banding format which divides a print job page into increments called "bands" 13. Further, for reasons such as memory conservation, the sequence of print data 30 may not follow the physical layout (top-to-bottom and left-to-right) of bar chart 150. Instead, operating system 20 may, for example, first send third bar 160, followed by vertical y axis 152, and conclude with the remaining print objects.

Render driver 37 must render picture elements and provide them to printer 18 in a sequence which follows the physical layout of model bar chart 150 (top-to-bottom, and left-to-right). Therefore, the present invention uses page driver 31 to analyze print data 30, and then to record the analysis data in the correct sequence in page data records (PDRs) located within page data 52. For example, print objects 152, 154, 156, 158, and 160 could be separately analyzed by page driver 31 and the analysis data recorded into journal file 33 in five separate PDRs. Each PDR would include an identifier 124 signifying whether the PDRs are part of a larger image. The PDRs each also contain a pointer 128 indicating which PDR should be read next, during the retrieval sequence performed by journal file processor 35. Page driver 31 also typically analyzes the five print objects and stores other analysis data into the respective PDRs. Examples of such analysis data include print object type 122 (such as DIB, graphic, text, bit-block transfer, or polygon), and print object attributes 126 (such as color information, line thickness, bounding rectangles, and a pointer connecting page data 52 to related standard drawing data 54). The analysis data is stored in page data 52 of journal file 33, and standard drawing calls are stored in standard drawing data 54 of journal file 33.

Page driver 31 then signals journal file processor 35 to retrieve the PDRs from journal file 33 and provide them to render driver 37. Journal file processor 35 reads each PDR in sequence, and then sends standard drawing data 54 to a render driver 37 standard interface via standard drawing signal 58, and also sends page data 52 to a render driver 37 escape interface via escape signal 56. Render driver 37 provides escape signal 56 to image/color processor 66. Escape signal 56 allows render driver 37 to obtain the results of the analysis procedure previously performed by page driver 31. Escape signal 56 can provide analysis data such as print object type 122, identifiers 124 showing related parts of an image, and print object attributes 126 (such as color information, line thickness, and bounding rectangles). This "look ahead" function allows render driver 37 to more efficiently process and render the print data because, rather than beginning to blindly render picture elements, render driver 37 has advance information about the ultimate print image desired. Render driver 37 processes and renders model bar graph 150 into picture elements using a varied type of binarization processing, depending on whether object type 122 is a DIB (device-independent bitmap), graphics, or text. This varied binarization processing also uses attributes 126 to perform image and color processing and to render the print object into picture elements having a conventional RGB (Red, Green, Blue) format. Image/color processor 66 performs a conversion process to reduce the pixel depth of the rendered picture elements by a factor of eight, resulting in pixels having one bpp (black and white) or three bpp (color) and then stores the rendered and converted pixels into bands within band buffer 67. Color converter 68 reads the bands out of band buffer 67, converts the RGB format to a format compatible with printer 18, and provides the elements in the correct sequence to spooler 17 which is accessible by printer 18 to produce high-quality printed images according to the present invention.

The invention has been explained above with reference to a preferred embodiment. Other embodiments will be apparent to those skilled in the art. For example, the journal file 33 could be implemented using a variety of storage devices, including the system hard drive 27, the system RAM 24, or a discrete journal file storage device. Further, the varied binarization process steps may occur in a variety of different sequences than those disclosed in the preferred embodiment. Also, the page driver 31 function of analyzing and storing print data 30, and the render driver 37 function of processing and rendering the picture elements may either operate sequentially, or they may operate concurrently as independently executable threads or execution modules, providing that the host operating system 30 is capable of supporting cooperative or preemptive multi-tasking operations. Operating the page driver 31 and the render driver 37 as concurrent processes using a multi-tasking operating system results in a more time-efficient printing system and significantly increases printer throughput.

Therefore, variations upon the preferred embodiments are intended to be covered by the present invention, which is limited only by the appended claims.

What is claimed is:

1. A computer system comprising:
    a processor for controlling the computer system;
    a printer driver coupled to the processor for receiving a predetermined plurality of print data including at least one print object each, said printer driver further comprising:
    a page driver for generating, analysis data based on all of the predetermined plurality of print data, said analysis data comprising a print object type and a plurality of print object attributes; and
    a separate render driver coupled to the page driver for processing the plurality of print data responsive to the analysis data and for rendering the processed print data into picture elements; and
    a printer coupled to the printer driver for producing printed images from the picture elements,
    wherein the render driver merges the picture elements into bands and stores the bands into a band buffer, and
    wherein the render driver variably processes and renders the processed print data into the picture elements before merging the picture elements into the bands and storing the bands into the band buffer.

2. The computer system of claim 1, further comprising a multi-tasking computer operating system for controlling said page driver to generate analysis data and for concurrently controlling said render driver to render the print data into picture elements.

3. An output device comprising:

a printer driver for receiving a predetermined plurality of print data having at least one print object, said printer driver including a page driver for generating analysis data based on all of the predetermined plurality of print data, said analysis data comprising a print object type and a plurality of print object attributes;

a journal file for storing the analysis data, a journal file processor for retrieving the analysis data, and a render driver for variably processing the plurality of print data responsive to the analysis data and for rendering the processed print data into picture elements; and a printer coupled to said printer driver for producing printed images from said picture elements, wherein the render driver merges the picture elements into bands and stores the bands into a band buffer, and wherein the render driver variably processes and renders the processed print data into the picture elements before merging the picture elements into the bands and storing the bands into the band buffer.

4. The output device of claim 3, further comprising a multi-tasking computer operating system for controlling said page driver to generate analysis data and for concurrently controlling said render driver to render the processed print data into picture elements.

5. A method for using a printer driver to control a computer printer comprising the steps of:

receiving a predetermined plurality of print data comprising at least one print object;

generating analysis data based on all of the predetermined plurality of print data, said analysis data comprising a print object type and a plurality of print object attributes;

processing the processed print data responsive to the generated analysis data;

rendering the plurality of print data into picture elements;

providing the picture elements to the computer printer to produce printed images;

merging the picture elements into bands, and storing the bands into a band buffer, wherein the steps of processing and rendering the print data occur before the steps of merging the picture elements into the bands and storing the bands into the band buffer.

6. The method of claim 5, wherein a multi-tasking computer operating system controls the step of generating analysis data and concurrently controls the step of rendering the processed print data into picture elements.

7. A computer-usable medium having computer-readable program code embodied therein for causing a computer system having a processor, a display, an input device, a memory, a printer, and a printer driver to perform the steps of:

receiving a predetermined plurality of print data comprising at least one print object;

generating analysis data based on all of the predetermined plurality of print data, said analysis data comprising a print object type and a plurality of print object attributes;

processing the processed print data responsive to the generated analysis data;

rendering the plurality of print data into picture elements;

providing the picture elements to the computer printer to produce printed images;

of merging the picture elements into bands; and storing the bands into a band buffer wherein the steps of processing and rendering the print data occur before the steps of merging the picture elements into the bands and storing the bands into the band buffer.

8. The computer-usable medium of claim 7, wherein a multi-tasking computer operating system controls the step of generating analysis data and concurrently controls the step of rendering the processed print data into picture elements.

9. An output device comprising:

means for receiving a predetermined plurality of print data comprising at least one print object;

means for generating analysis data based on all of the predetermined plurality of print data, said analysis data comprising a print object type and a plurality of print object attributes;

means for processing the plurality of print data responsive to the generated analysis data;

means for rendering the processed print data into picture elements;

means for providing the picture elements to the computer printer to produce printed images; and means for merging the picture elements into bands and means for storing the bands into a band buffer and wherein the means for rendering variably processes and renders the processed print data into the picture elements before merging the picture elements into the bands and storing the bands into the band buffer.

10. The output device of claim 9, further comprising multi-tasking operating system means for controlling the means for generating analysis data and for concurrently controlling the means for rendering the processed print data into picture elements.

* * * * *